Sept. 8, 1953      R. R. RANDALL      2,651,214
GEARLESS DIFFERENTIAL
Filed July 14, 1950      4 Sheets-Sheet 1
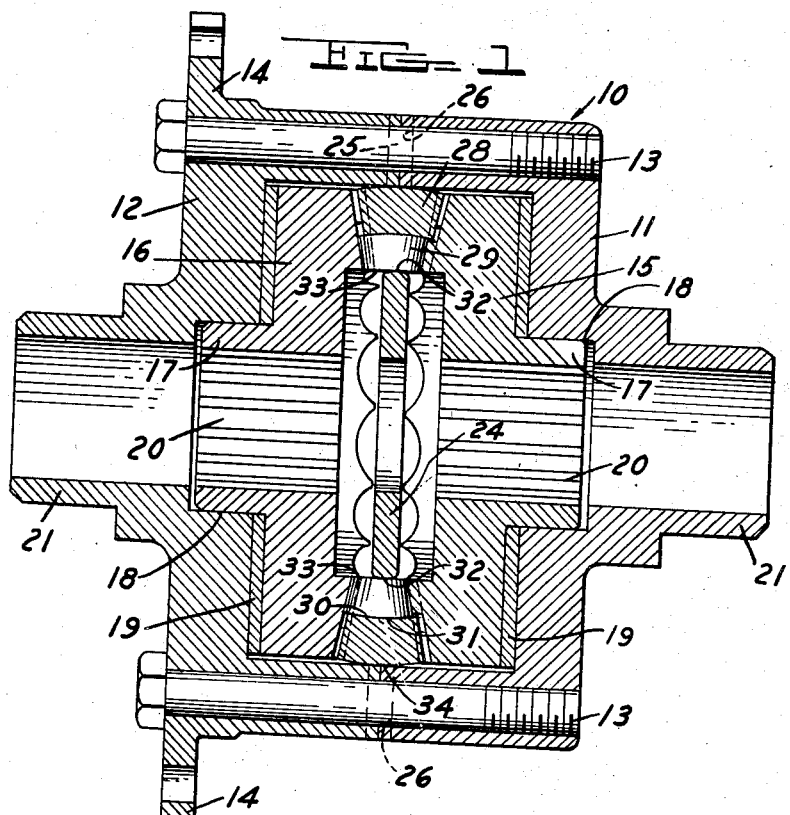
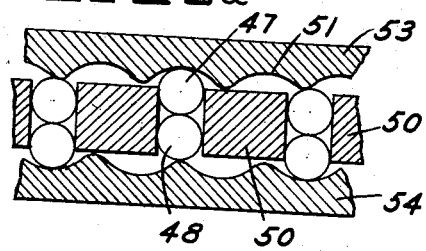
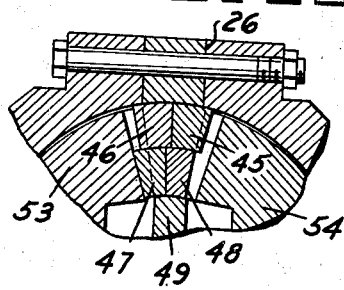
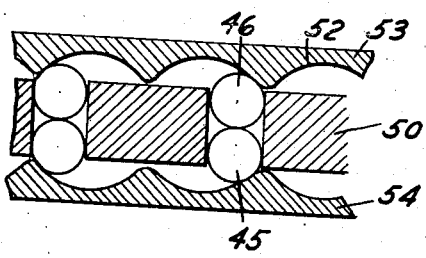
INVENTOR.
RALPH R. RANDALL
BY
ATTORNEYS

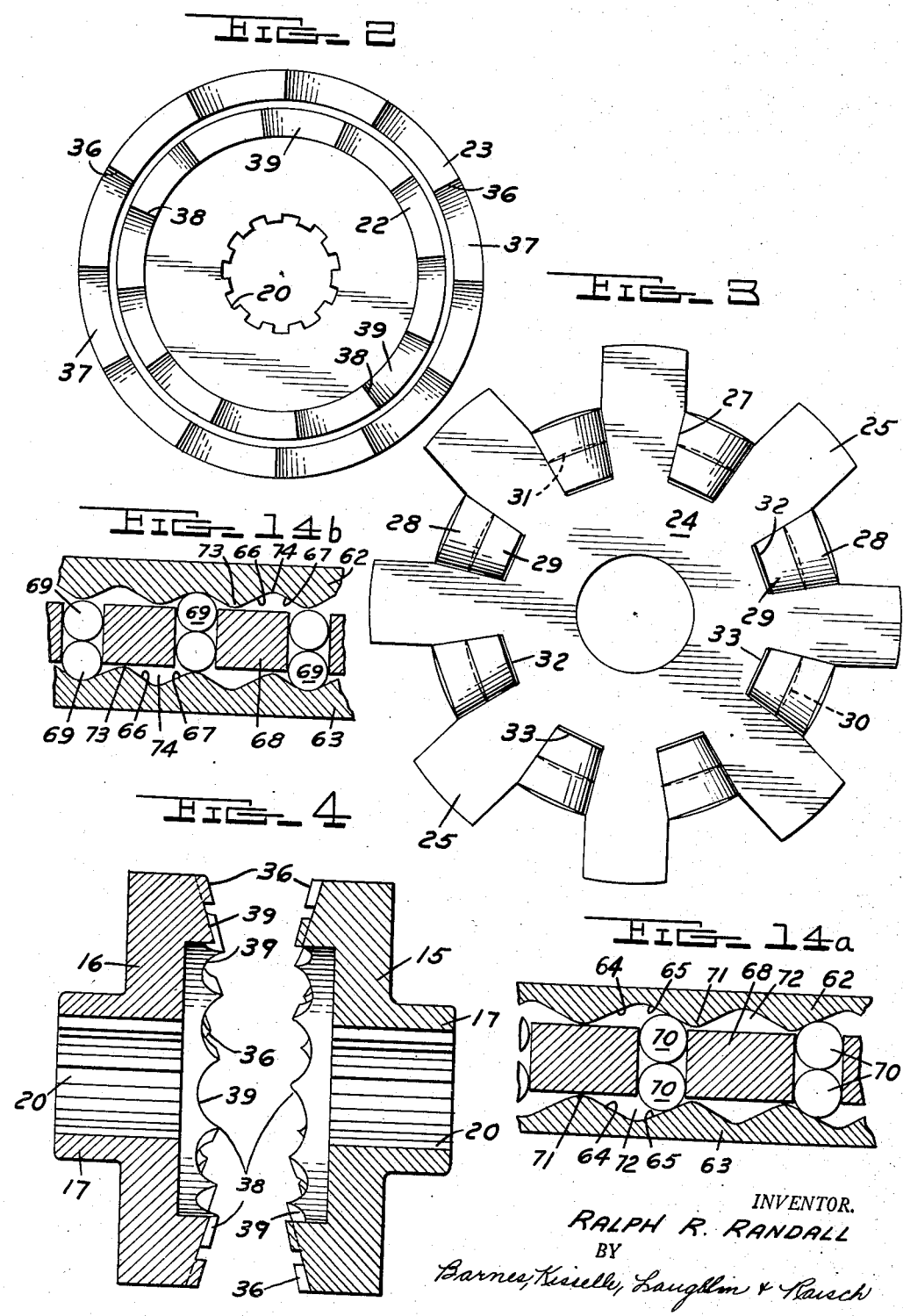

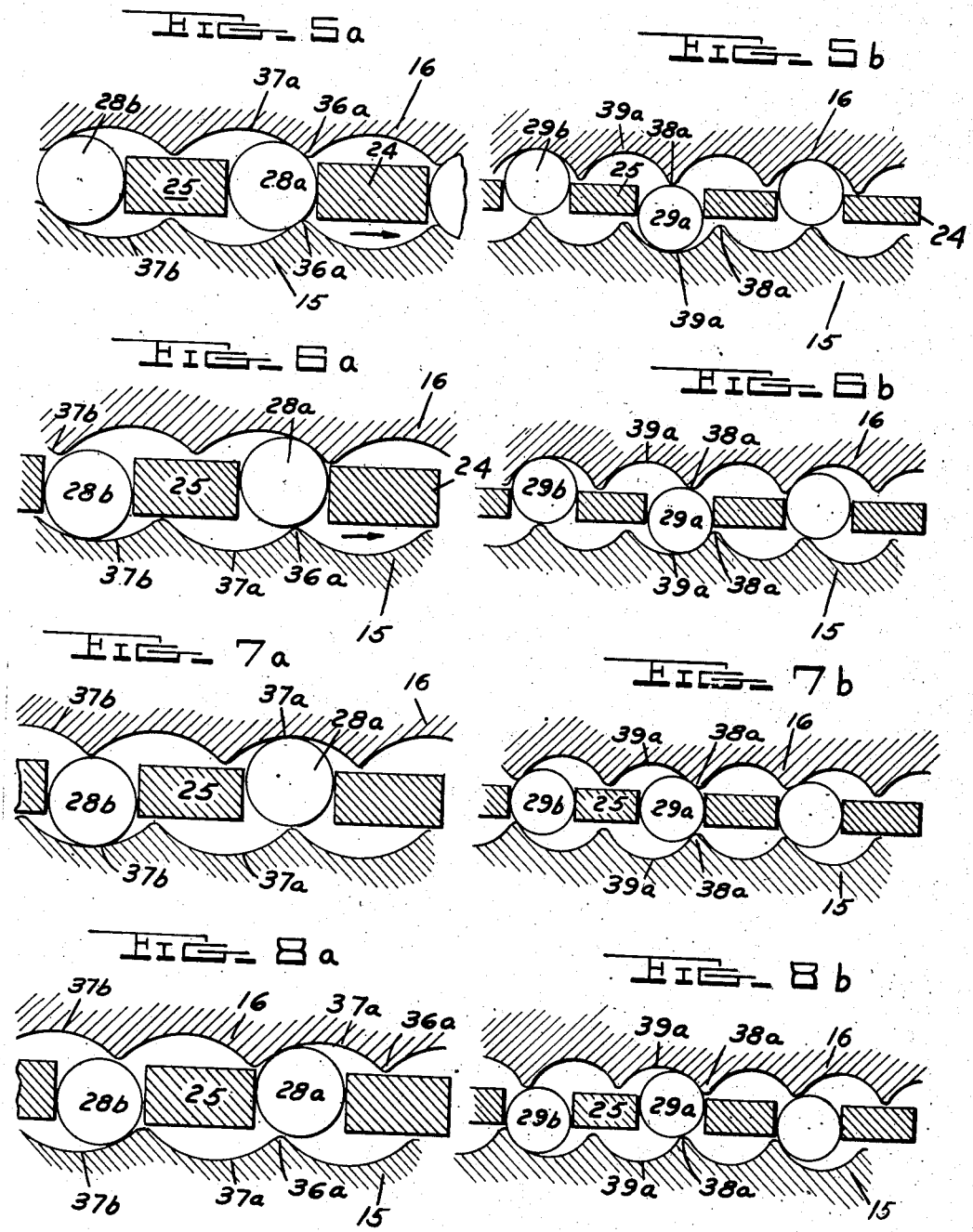

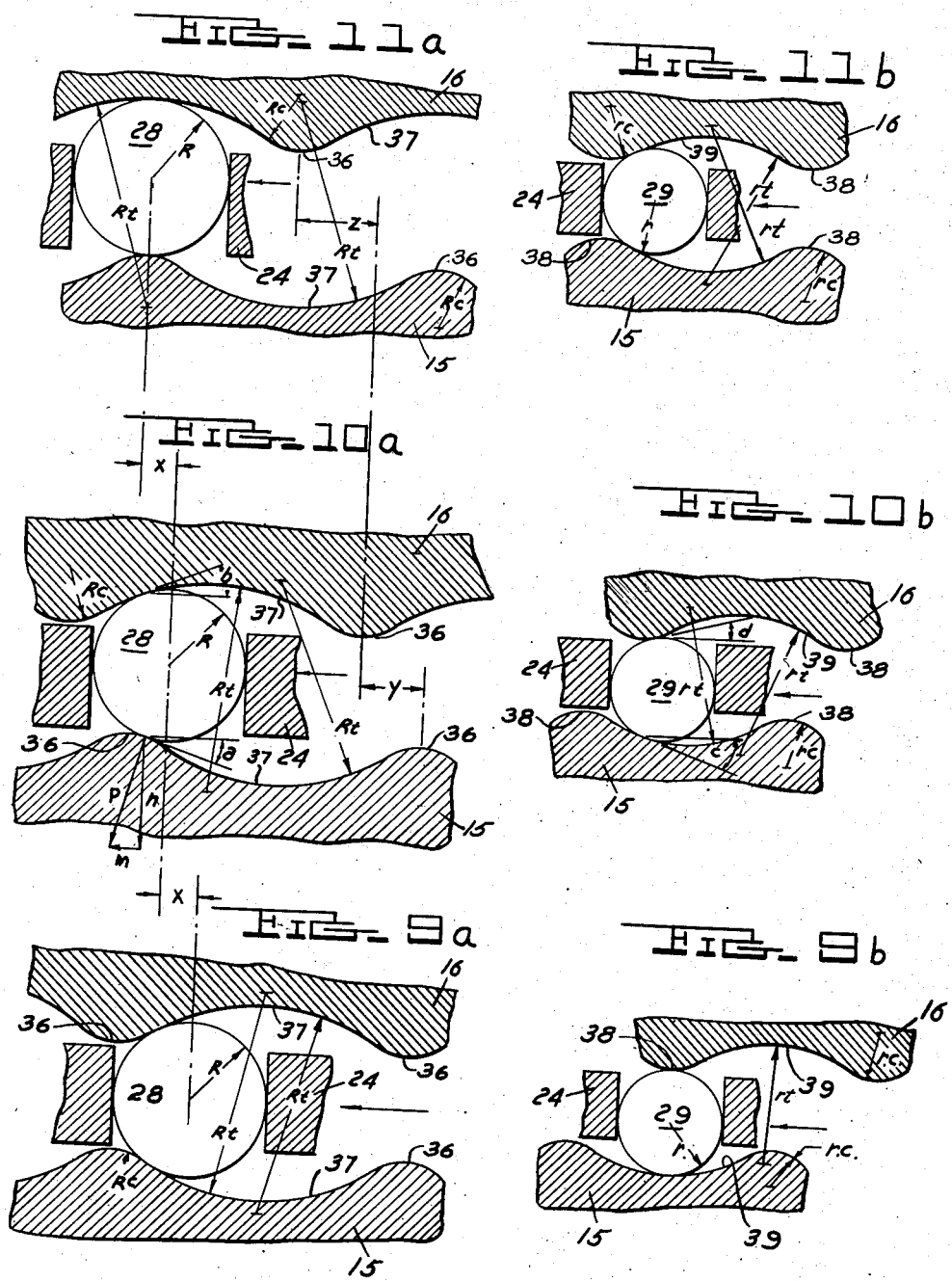

Patented Sept. 8, 1953

2,651,214

UNITED STATES PATENT OFFICE 2,651,214

GEARLESS DIFFERENTIAL

Ralph R. Randall, Freeport, Ill., assignor to Detroit Safety Clutch Corporation, Detroit, Mich., a corporation of Michigan Application July 14, 1950, Serial No. 173,756

14 Claims. (Cl. 74—650)

This invention relates to a power transmission and more particularly to a clutch controlled divided power flow transmission.

It is an object of this invention to provide a clutch controlled divided power flow transmission for driving a pair of members which is designed such that both members will be positively driven even through the resistance to turning of one of the members greatly exceeds the resistance to turning on the other member. The transmission of this invention is, furthermore, designed to accomplish this without the danger of a positive locking of the two driven members so that the unit is capable of differentiating the speed of the two driven members at all times. At the same time, my divided power flow transmission is designed such that, while the driving members are being driven, a greater percentage of the power applied is concentrated on the driven member offering the greatest resistance to turning.

More specifically, the invention contemplates a divided power flow transmission in which the power flow is controlled by a pair of clutch members having opposed corrugated clutch faces between which are mounted tapered radial rollers carried by the driven member. The clutch members are designed such that positive locking with the rollers is avoided. The power is transmitted by utilizing the principle of roller pressure against an inclined plane. The clutch members and rollers are also designed such that the friction therebetween will be in the form of rolling pressure and not sliding friction.

Other objects in the way of construction and the operation of my divided power flow transmission will become apparent from the accompanying description taken in conjunction with the following drawings in which:

Figure 1 is a sectional view of a divided power flow assembly incorporating my invention and taken on a vertical plane transversely of the driving axis of the unit.

Figure 2 is a plan view of one of the clutch plates.

Figure 3 is a plan view of the carrier cage with the rollers mounted thereon.

Figure 4 is a vertical section through the clutch plates.

Figure 5a is a diagrammatic view illustrating the relative positions of the rollers and outer races of the clutch plates at one stage of their movement.

Figure 5b is a diagrammatic view illustrating the relative positions occupied by the inner races of the clutch plates and rollers when the outer races are in the positions shown in Figure 5a.

Figures 6a and 6b, 7a and 7b, 8a and 8b are diagrammatic views similar to 5a and 5b but showing the relative positions occupied by the clutch plates and rollers at progressive increments of 7½° of rotation of one of the clutch plates relative to the other.

Figures 9a and 9b, 10a and 10b, 11a and 11b are diagrammatic views on an enlarged scale illustrating more particularly the manner in which the driving effort shifts from one set of races to the other when the resistance to turning is greater on one of the clutch plates that the other.

Figure 12 is a fragmentary sectional view similar to Figure 1 but showing a modified form of the invention.

Figure 13a is a diagrammatic view of one position of the rollers and outer races of the clutch plates in the modified form of the invention illustrated in Figure 12.

Figure 13b is a diagrammatic view showing the relative positions occupied by the rollers and inner races of the clutch plates when the outer races are in the position shown in Figure 13a.

Figures 14a and 14b are views similar to Figures 13a and 13b showing a modified form of race construction.

A divided power flow transmission of my invention is adapted for driving a pair of members at relative velocities and may be used in a variety of different applications where a device of this type is necessary. It is particularly useful in driving the wheels of a vehicle and therefore, for the purposes of illustration, the divided power flow transmission will be described in a form adapted for use on an automotive vehicle.

Referring to the drawings, the transmission assembly is housed within a casing 10, which preferably comprises two cup shaped members 11 and 12 which are secured together as by bolts 13. One of the members is provided with an apertured flange 14 by means of which a ring gear (not shown) may be secured. The ring gear would be arranged to be driven in a conventional manner by the drive shaft of the motor vehicle. Within the housing 10 there are disposed two clutch plates 15 and 16 having hubs 17, which are journalled in bearings 18 and members 11 and 12. Clutch plates 15 and 16 are provided with aligned splined apertures 20 for receiving the splined end of axles on which the driving wheels of the vehicle are mounted. Casing members 11 and 12 are each fashioned with a bearing 21 aligned with apertures 20 in plates 15 and 16 through which the axles extend. Bearing plates 19 are provided for taking the end thrust of clutch members 15 and 16. These bearing plates provide the desired friction between plates 15 and 16 and the inner end face of casing members 11 and 12 as will be more fully explained hereinafter.

Plates 15 and 16 are each provided with inner and outer concentric annular corrugated races 22 and 23, respectively. A carrier cage 24 is mounted within casing 10 between plates 15 and 16. Cage 24 is provided with a series of radial lugs 25 which are received by sockets 26 formed in members 11 and 12 so as to provide a positive driving connection between the cage and casing 10. Between lugs 25 carrier cage 24 is provided with radial slots 27 in which are seated two series of frusto-conical rollers 28 and 29. The outer ends of the inner rollers 29 are provided with a convex contour as at 30 on which the inner concaved end 31 of the outer rollers 28 seat. The seats 32 on cage 24 are formed as cylindrical surfaces and the inner ends 33 of the inner rollers 29 are plane surfaces perpendicular to the axes of the rollers. The surfaces 30 and 31 lie in the surface of a sphere having its center at the center of carrier cage 24. The outer ends 34 of rollers 28 are likewise formed with a convex surface having its center at the center of carrier cage 24. The ends of the rollers and the seats on the carrier cage are shaped in this manner to permit the rollers to shift in a direction transversely of the plane of carrier cage 24 on true radial axes. The degree of radial shift of rollers 28 and 29 is controlled by the corrugations of the races 22 and 23.

In the preferred form of the invention the corrugations on the outer race 23 comprise a series of radially extending teeth 36 of frusto-conical shape which are separated by frusto-conical trough portions 37. Teeth 36 and troughs 37 present smooth rolling surfaces having an inclination corresponding to that of frustum rollers 28 so that, as the rollers travel laterally and circumferentially from one crest to the next, they maintain a true radial position with respect to carrier cage 24. In other words, the inclination is such that roller 28 rolls rather than slides in trough 37 and in so doing its axis rotates about the center of carrier cage 24.

The inner race 22 is likewise provided with teeth 38 and troughs 39 which bear a similar relation to inner rollers 29, such that as the rollers roll from one crest to the next, they shift laterally and circumferentially within recesses 27 and maintain a true radial position with respect to the center of carrier cage 24. This true radial positioning of the rollers results from generating the surfaces of the corrugations and the rolling surfaces of the rollers by means of a line passing through the axial center of the carrier plate 24. It will be noted that the crests 36 on outer race 23 are circumferentially offset from crests 38 on inner race 22. These crests are staggered in this manner such that when the crests on races 22 of plates 15 and 16 are opposite, the crests 36 on races 23 of members 15 and 16 will be circumferentially offset, preferably to the extent that the crests on one plate will be opposite the midpoint of the trough on the other plate.

One of the important features of my invention resides in the design of the troughs and crests in each race. It will be noted (Figures 9a through 11b) that the radius of the troughs in each race is substantially greater than the radii of the teeth crests. The relative radii of these formations control, to a large extent, the operating characteristics of the device as will be more fully described hereinafter.

The number of crests or teeth employed will be determined by the load to be transmitted by the clutch plates and the dimensional limitations imposed by the design. In the drawing shown, twelve sets of crests or teeth are shown on each race, the crests on each race being spaced apart 30°, the crests on the outer race being offset circumferentially from the crests of the inner race 7½°. It will be noted that although twelve sets of crests are provided on each clutch plate, there are only eight sets of rollers on carrier cage 24. With this arrangement, there will be two sets of rollers for each three sets of teeth on the clutch plates. The rollers are arranged (Figure 5a) in each race such that when one roller is in position to drive plates 15 and 16 in one direction, the next adjacent roller is in position to drive the plates in the reverse direction. The rollers are proportioned to the number of teeth and arranged in this manner to prevent lost motion when the driving torque is reversed in direction.

The relative positions occupied by the rollers in each race are illustrated in a general way in Figures 5a through 8b. In Figure 5a the rollers 28 in the outer race are shown in a position applying driving pressure to both clutch plates when the carrier cage 24 is driven in the direction indicated by the arrow. Roller 28a, it will be noted, is disposed on the inclined portions of troughs 36a of the two plates and bears tangentially against these surfaces at points adjacent the crests 36a. Roller 28b is in position to drive plates 15 and 16 without any lost motion should the direction of rotation of carrier cage 24 be reversed. When the rollers in the outer race occupy the positions shown in Figure 5a, the rollers in the inner race assume the by-passing position illustrated in Figure 5b. The relative positions of these rollers are, of course, determined by the relative positions of the two sets of races on the clutch plates. Roller 29a is disposed between the lowermost portion of trough 39a on plate 15 and the crest of tooth 38a on plate 16 and the adjacent roller 29b is reversely positioned between the crest of a tooth on plate 15 and the bottom of a trough on plate 16. In this position rollers 29 are unable to exert any force on either clutch plate having a component in the direction of rotation and the driving torque of carrier cage 24 is transmitted to the clutch plates entirely by rollers 28.

If the speed of rotation of plate 15 is decreased relative to plate 16, such as when the vehicle is negotiating a turn, in which case one driving wheel rotates faster than the other, then the rollers and plates occupy the progressive positions illustrated in Figures 6a through 8b. As the speed of plate 15 decreases, roller 28a rolls upwardly in the trough 37a towards the tooth crest 36a on plate 15 to the position illustrated in Figure 6a. In so doing, roller 28a accelerates plate 16 and has rolled in trough 37a on plate 16 in a direction away from the tooth crest 36a. While this movement occurs in the outer race, roller 29a in the inner race rolls upwardly in trough 39a towards the crest of tooth 38a on plate 15 as is illustrated in Figure 6b. As will be more fully explained hereinafter, in the positions generally illustrated in Figures 6a and 6b, roller 28a is being released from driving engagement with plates 15 and 16 and roller 29a is now assuming a driving position relative to the clutch plates. In Figures 7a and 7b the rollers 28 in the outer race have reached a by-passing position while the rollers 29a in the inner race are exerting a maximum driving pressure against both clutch plates. The positions assumed by the two sets of rollers when the drive is being transferred from the rollers in the inner race to the rollers in the outer race are shown diagrammatically in Figures 8a and 8b.

It will be noted in the arrangement illustrated that when the teeth of a corresponding set of races are diametrically opposed, the rollers are disposed with their axes spaced from one set of opposed teeth a distance equal to one quarter the distance between successive teeth. This is necessary since the average velocity of the faster moving clutch plate is twice the velocity of the carrier cage.

I have determined that by proper design of the teeth and indentations on the clutch plates, the unit will drive both driven members without locking even though the resistance to turning on one of the members greatly exceeds the other. It is probable that locking of the members would occur if the driving angle between the roller and the clutch plates, that is, the angle between the tangent at the point of contact and the plane of rotation of the clutch plates, falls below a wedging angle of about 10° while the roller is in driving relation with the clutch plate. This type of locking, due to wedging, is avoided in my unit by designing the teeth and indentations on the races of the clutch plates such that, when the driving angles between one set of rollers and the clutch plates approach a wedging angle, the other set of rollers comes into driving relation and the first set of rollers by-passes the teeth on the clutch plate with no apparent driving effort.

It is believed that this shifting of the driving effort from one set of rollers to the others is illustrated more clearly in Figures 9a through 11b. It will be noted from these illustrations that the radius $R_t$ of troughs 37 is greater than the radius $R_c$ of the tooth crests 36 on the outer race and that the radius $r_t$ of troughs 39 is greater than the radius $r_c$ of tooth crests 38 on the inner race. It will also be noted that the radius R of rollers 28 is greater than $R_c$ and less than $R_t$ and that the radius $r$ of the rollers 29 is greater than $r_c$ and less than $r_t$.

Assuming for the purposes of illustration that the rollers 28 in the outer race are disposed in the driving positions illustrated in Figure 9a, then the rollers 29 in the inner race are disposed in the by-passing position illustrated in Figure 9b. Then if a driving torque is applied to carrier cage 24 in the direction indicated by the arrow and plate 15 is restrained from rotating, roller 28 will roll along the surface generated by $R_c$ on plate 15 towards the crest of tooth 36 and, in so doing, it moves laterally with the opposite side of the roller rolling towards the base of trough 37 on the surface generated by $R_t$ on plate 16, thus driving plate 16 forwardly. At the same time, roller 29 on the inner race rolls on plate 15 along the surface generated by $r_t$ towards the crest of tooth 38 and moves laterally so that its opposite side (neglecting clearance) rolls over the surface generated by $r_c$ on plate 16. It is believed that, as the rollers move from the positions indicated in Figures 9a and 9b, the torque applied by cage 24 to the rollers is transferred to the plates entirely by rollers 28 until the rollers reach a predetermined position indicated at Figures 10a and 10b. It is believed that the lateral movement of rollers 28 in rolling on plate 15 from the position indicated in Figure 9a to that indicated in 10a tends to accelerate plate 16 to a greater extent than roller 29 because of the difference in radii of the indentations and tooth crests. However, when a point such as is illustrated in Figures 10a and 10b is reached, the rate of lateral movement of roller 29 begins to exceed the rate of lateral movement of roller 28 and rollers 29 now assume a pressure contacting relation with the clutch plates and rollers 28 are relieved from driving pressure.

The driving angles of rollers 28 when the drive shifts from rollers 28 to rollers 29 are indicated $a$ and $b$ in Figure 10a and the minimum driving angles on rollers 29 when the drive shifts are indicated $c$ and $d$ in Figure 10b. Angles $a$, $b$, $c$ and $d$ are all greater than 10°, which I have assumed to be the minimum driving angle beyond which the plates 15 and 16 would be locked together because of the wedging action of the rollers.

I have found that the minimum driving angles $a$, $b$, $c$ and $d$ of the two sets of rollers can be decreased by increasing the radii $R_t$ and $r_t$ of the troughs 37 and 39 relative to the radii $R_c$ and $r_c$ of the tooth crests 36 and 38 and that these minimum driving angles can be increased by decreasing $R_t$ and $r_c$ relative to $r_t$ and $r_c$. Therefore by suitable selection of the radii of the rollers, troughs, and tooth crests these minimum driving angles can be controlled.

It will be observed that, as rollers 28 and 29 roll from the positions indicated in Figures 9a and 9b to those indicated in Figures 10a and 10b, roller 28 has advanced the distance $x$ and plate 16 has been advanced the distance $y$. The distance $y$ is slightly less than twice the distance $x$.

Then, if the application of the torque of cage 24 is continued, the rollers will roll from the positions indicated in Figures 10a and 10b to the positions indicated in Figures 11a and 11b. During this interval it will be noted that roller 29 is moving laterally at a much more rapid rate than roller 28 and its tendency to accelerate plate 16 will be greater than the tendency for roller 28 to accelerate plate 16. Therefore roller 29 will assume a driving relation with the plates, and roller 28 will be relieved of driving pressure and will assume a condition of by-passing in relation to the plates. In rolling from the position indicated in Figure 10a to that shown in Figure 11a it will be noted that roller 28 has again moved forwardly the distance $x$ while plate 16 has advanced the distance $z$, which latter distance is slightly greater than twice the distance $x$. This indicates that, in advancing from the position indicated in Figure 9a to that indicated in 10a, plate 16 is decelerated and that, in moving from the position indicated in Figure 10a to Figure 11a, plate 16 is accelerated in its forward movement. I have detected this slight accelerating and decelerating movement of the one plate when the other is held rigid by testing the unit on a dynamometer.

It will be noted that in Figure 11b roller 29 is in the position occupied by roller 28 in Figure 9a and that the roller 29 will continue to exert driving pressure on the clutch plates until it reaches the position occupied by roller 28 in Figure 10a.

With the above description of the driving relationship of the rollers and plates, it is believed that the reason why both driven members, that is, both clutch plates, will be driven even though the resistance to turning on one member greatly exceeds the resistance on the other will be readily understood. It will be noted that the driving pressure exerted by the rollers on the clutch plates is at all times inclined to the plane of rotation of the clutch plates.

The driving pressure may be resolved into two components, one parallel to the plane of rotation and the other perpendicular to the plane of rotation. These force components are illustrated diagrammatically in Figure 10a and are designated $m$ and $n$, respectively. The component $m$ of pressure $p$ tends to rotate the clutch plates but the component $n$ urges the clutch plates apart against the bearing plates 19. The friction at the faces of bearing plates 19 tends to resist relative rotation between the clutch plates on the one hand and housing members 11 and 12 on the other hand. Therefore as long as the frictional drag on one of the clutch plates exceeds the tendency for the rollers to drive that plate faster than the housing 10 is being driven, both the clutch plates and the housing will be driven at the same speed and will rotate as a unit. Translated into terms of practical effect, this means that when used on a vehicle, and the traction on the two driven wheels differ, both wheels will be rotated at substantially the same speed as long as the combined resistance produced by the traction on the wheel of least traction and the frictional drag on the corresponding clutch plate exceed the tendency for the rollers to accelerate that clutch plate over the other. The maximum outward force on the clutch plates is, of course, determined by the minimum driving angles of the rollers; the shallower the rollers, the greater the outward force and therefore the greater the disparity in traction permissible on the two driven wheels before one wheel will spin. The smoothness and nature of the faces of bearing plates 19, will, of course, also control to a certain extent the maximum ratio of the resistance on the two clutch plates in which spinning is avoided since the nature of these faces determines the fractional drag on the clutch plates.

It will be appreciated that as long as the traction on the two wheels is within a ratio which causes both wheels to rotate together, the wheel of least traction is unable to utilize half of the available power and therefore the wheel having the greater traction will receive the greater percentage of the driving torque.

In actual tests of my divided power flow transmission, a unit of the type described was employed as a differential in a military vehicle equipped with a motor rated to deliver 100 ft. lbs. The outer diameter of the housing 10 was 4 3/16". The clutch plates were 3 7/32" in diameter with 9 teeth in each series. The major radius of the tooth crest was .184", while the major radius of the concave indentation was .7868". The large rollers had a mean diameter of about 7/8" while the small rollers had a mean diameter of about 13/32". The unit was subjected to a brake test in which a constant load of 38 pounds was applied to one wheel and on the other wheel a load of 38 pounds was applied and decreased approximately 5 pounds at a time. Both wheels rotated until the load on the one wheel was reduced to 6 pounds at which reading the wheel loaded with 38 pounds stopped rotating and the wheel loaded with 6 pounds rotated at an increased velocity. It will be noted that the ratio of the loads on the two wheels before the one wheel spun is approximately 6 1/3 to 1. As was previously explained, this ratio can be varied by controlling the relative radii of the tooth crests and troughs; but it will be appreciated, however, that the greater this ratio, the greater will be the tendency for the unit to lock.

It will be appreciated that by employing rollers for transmitting the torque from the carrier cage to the clutch plates, the unit stresses encountered are much less than those that would result if balls or sliding pins were used in place of rollers. In applications designed for excessively high torque where the size of the transmission casing is limited because of other design factors, the unit pressure encountered on the rollers in the form of the invention illustrated in Figures 1 through 8b, may approach the crushing limit of the rollers and there is, therefore, illustrated in Figures 12 through 13b a modified form of the invention. In this modification, instead of employing a series of single rollers in each of the outer and inner races, the rollers are arranged in pairs.

As is illustrated in Figure 12, the series of rollers in the outer races of the clutch plates are arranged as paired rollers 45 and 46, and the rollers in the inner races are arranged in pairs 47 and 48. These rollers are supported by carrier cage 49 so that the axes of the rollers intersect at the axis of rotation of carrier cage 49. The lugs 50, between which the rollers are seated, are such as to apply a radial pressure to both rollers in each pair in a direction parallel to the plane of rotation of carrier cage 49. The pressure exerted by the lugs is, therefore, divided between the rollers in each pair and the unit stress is thereby maintained within safe limits. The corrugations 51 and 52 on the inner and outer races of clutch plates 53 and 54 preferably correspond with the inclination of the tapered surfaces of rollers 45, 46, 47 and 48 in the same manner as previously described with reference to Figure 1 so that the rollers maintain a true radial movement with respect to the axis of rotation of carrier cage 49.

The operation of the divided power flow transmission, illustrated in Figures 12 through 13b is substantially the same as that described with reference to Figures 1 through 11b. When the rollers in either the outer or the inner races are in the by-passing position, the rollers in the other race are exerting a maximum torque on both clutch plates. If one clutch plate offers greater resistance to turning than the other, then the rollers tend to by-pass the corrugations on the clutch plate offering the greatest resistance to rotation in the same manner as previously described. Clutch plates 53 and 54 are spaced apart and the radii of corrugations 51 and 52 are controlled such that the driving contact angle of the rollers against the inclined faces of the corrugations falls at all times above 10°, and preferably above 12°. With the driving contact angle limited in this manner wedging or locking is prevented.

In Figures 14a and 14b, a modified form of construction for the races of the clutch plates is shown. In Figure 14a the relative positions of the rollers in the outer race are shown when the rollers in the inner race occupy the positions shown in Figure 14b. The clutch plates designated as 62 and 63 are substantially the same as clutch plates 15 and 16 previously described except for the races. In this modification the inner and outer races are each formed with alternately inclined faces, 64 and 65 on the outer races and 66 and 67 on the inner races. These inclined faces are inclined relative to each other and also to the vertical plane of carrier 68 so as to correspond with the tapered surfaces of frusto-conical rollers 69 and 70 in the outer and inner races, respectively. Each adjacent pair of inclined faces 64 and 65 intersect to form a crest 71 and a trough 72. Faces 66 and 67 on the inner races provide crests 73 and troughs 74. The radii at the tooth crests and at the base of the corrugations are controlled such as to produce the desired driving relationship of the rollers and clutch plates while maintaining the driving angle greater than a wedging angle.

It will thus be seen that I have provided a divided power flow transmission which has very desirable operating features. The driving angles between the rollers and the teeth on the clutch plates are prevented from falling below a wedging angle and therefore a positive locking of the clutch plates due to wedging is avoided. The arrangement furthermore provides a divided power flow transmission in which both of the driven members will be positively driven even though the resistance on one of the members greatly exceeds the resistance on the other member. At the same time, the unit is designed such that, when both driven members are being driven, a greater percentage of the power is transmitted to the member offering the greatest resistance to turning.

My device is furthermore very compact, and a unit of relatively small size is capable of transmitting a very large torque. This feature is especially advantageous when the unit is used as a differential on a motor vehicle where size is oftentimes a limiting factor. One of the features of my unit which makes for its compactness is the use of frustrum rollers for the torque transmitting devices. These rollers present a relatively large contact area as compared with balls and, at the same time, they avoid the undesirable sliding friction and wear encountered in divided power flow transmissions employing reciprocating pins.

It will also be noted that the units described may also be used for the purpose of speed reduction. If power is applied to one clutch plate and the other is held against rotation in the opposite direction, the carrier cage will be rotated at a reduced velocity with only a slight counter rotational torque on the clutch plate being held.

It will be appreciated that the relative arrangement of the corrugations or troughs on the inner and outer races of the clutch plates may be other than that illustrated in Fig. 2. The location of the crests on one race with respect to the crests on the other race depends upon the manner in which the rollers 28 and 29 are arranged on the carrier cage 24. When the rollers are aligned radially as is illustrated in Fig. 3, the races on the clutch plates take the general form illustrated in Fig. 2. If the rollers in each pair on carrier cage 24 are staggered circumferentially, then it will be appreciated that the position of the crests and troughs on one race relative to the crests and troughs on the other race will be different than that shown in Fig. 2. The characteristic feature of my arrangement lies in the fact that when the crests in one set of races are opposed, the crests in the other set of races are circumferentially offset.

I claim:

1. A divided power flow transmission comprising a housing, a pair of spaced apart axially aligned clutch plates rotatably supported within said housing, said clutch plates having on the opposing faces thereof at least two radially spaced annular races comprising a plurality of circumferentially spaced corrugations, a carrier plate positioned between the opposing faces of said clutch plates and coaxial therewith, and at least two annular series of frusto-conical rollers on said carrier plate movable in a direction transversely of the plane of said carrier plate, each of said series of rollers being arranged to roll between a set of corresponding races on said clutch plates, said clutch plates being spaced apart only sufficient to permit the rollers to roll between the trough of the corrugation on one race and the crest of corrugation on the opposing race, said corrugations being formed with frusto-conical surfaces at the trough and crest portions thereof, the surfaces of said crests and troughs and said rollers being generated by a line passing through the axial center of said carrier plate whereby said rollers maintain rolling line contact with said crests and troughs at all times, said carrier plate being keyed to rotate with said housing, the faces of said clutch plates opposite said races being fashioned to exert pressure against the end walls of said housing and thereby prevent said clutch plates from freely rotating in said housing under the influence of said rollers.

2. The combination set forth in claim 1 including bearing means interposed between said clutch plates and said end walls of said housing, said bearing means providing a limited frictional engagement between said clutch plates and said end walls.

3. A divided power flow transmission comprising a pair of axially aligned clutch plates spaced apart and in face to face relation, said plates each having at least two concentric and radially spaced annular races on the opposing faces thereof, each of said races having a series of radially extending depressions intersecting to form a radially extending beveled tooth, said depressions being arranged such that when the teeth on a corresponding set of races on said clutch plates are diametrically opposed, the teeth on another set of corresponding races are circumferentially offset relative to each other, a carrier plate positioned between the opposing faces of said clutch plates and coaxial therewith, said carrier plate having a plurality of radial recesses therein and at least two annular series of frusto-conical rollers seated in said recesses, said series of rollers being spaced apart to correspond with the radial spacing of said races, said rollers being seated on said carrier plate for movement freely in a plane transversely of the plane of said carrier plate, the rollers and teeth in each race are positioned relative to each other such that when the teeth of a corresponding set of races are diametrically opposed, the axis of each roller in said set of corresponding races is spaced from one set of opposed teeth one quarter the distance between successive pairs of opposed teeth, said clutch plates being spaced apart only sufficient to permit the rollers to roll freely between the beveled faces of said opposing races in an undulating path circumferentially of said clutch plates.

4. The combination set forth in claim 3 wherein said teeth and said faces of said depressions are beveled to correspond with the tapered outer surface of said rollers so as to maintain line contact with the surface of said rolers.

5. The combination set forth in claim 3 wherein said teeth and the faces of said depressions are beveled to correspond with the tapered surface of said rollers whereby the rollers maintain line contact with said teeth and depressions and retain a true radial position relative to the axis of said carrier plate.

6. A divided power flow transmission comprising a driving member and a pair of driven members, said driving member comprising a rotatable carrier plate having a plurality of radially extending frusto-conical rollers positioned thereon for movement in a plane transversely of the plane of said plate, said rollers being arranged in at least two annular radially spaced series, said driven members comprising a pair of clutch plates positioned coaxially with said carrier plate on opposite sides thereof, each of said clutch plates having concentric annular races thereon spaced radially to correspond with the annular series of rollers on said carrier plate, said races being corrugated, the crest of the corrugations forming radially extending teeth, said corrugations being spaced around each race such that when the crests on a corresponding set of races are diametrically opposed, the crests on another set of corresponding races are circumferentially offset relative to each other, whereby, when the rollers in one set of races are disposed between the crests on one race and the center of the troughs on the other race, the rollers in another set of corresponding races are driving relation with the corresponding races on said other set of races, said plates being spaced apart just sufficient to permit said rollers to roll freely between the crest of a corrugation on one plate and the center of the trough of a corrugation on the other plate, said corrugations being beveled such that the rollers maintain line contact with the corrugations on both of said clutch plates.

7. The combination set forth in claim 6 including a housing and wherein said clutch plates are rotatably supported within said housing, said clutch plates being arranged to exert pressure in a direction transversely of the plane thereof against the end walls of said housing.

8. The combination set forth in claim 6 wherein said clutch plates are spaced apart and the relative radii of said tooth crests and the troughs of said corrugations are such that the contact angle between a roller and the surfaces of said races relative to the plane of said carrier plate is maintained above 10° when the roller is in driving relation with said races.

9. The combination set forth in claim 6 wherein the rollers in each of said series are arranged in pairs, the rollers in each pair being disposed side by side with their axes spaced transversely of the plane of said carrier plate and with their adjacent surfaces in line contact.

10. The combination set forth in claim 6 wherein said corrugations are triangularly shaped.

11. The combination set forth in claim 6 wherein the troughs and crests of said corrugations are provided with frusto-conically shaped surfaces over which said rollers roll.

12. A divided power flow transmission comprising a pair of axially aligned clutch plates spaced apart and in face to face relation, said plates each having at least two concentric and radially spaced annular races on the opposing faces thereof, each of said races having a series of radially extending depressions intersecting to form a radially extending beveled tooth, said depressions being arranged such that when the teeth on a corresponding set of races on said clutch plates are diametrically opposed, the teeth on another set of corresponding races are circumferentially offset relative to each other, a carrier plate positioned between the opposing faces of said clutch plates and coaxial therewith, said carrier plate having a plurality of radial recesses therein and at least two annular series of frusto-conical rollers seated in said recesses, said series of rollers being spaced apart to correspond with the radial spacing of said races, said rollers being seated on said carrier plate for movement freely in a plane transversely of the plane of said carrier plate, said clutch plates being spaced apart only sufficient to permit the rollers to roll freely between the beveled faces of said opposing races in an undulating path circumferentially of said clutch plates, the teeth in each of said races being spaced apart such that the included angles between successive teeth are the same in both races.

13. A divided power flow transmission comprising a pair of axially aligned clutch plates spaced apart and in face to face relation, said plates each having at least two concentric and radially spaced annular races on the opposing faces thereof, each of said races having a series of radially extending depressions intersecting to form a radially extending beveled tooth, said depressions being arranged such that when the teeth on a corresponding set of races on said clutch plates are diametrically opposed, the teeth on another set of corresponding races are circumferentially offset relative to each other, a carrier plate positioned between the opposing faces of said clutch plates and coaxial therewith, said carrier plate having a plurality of radial recesses therein and at least two annular series of frusto-conical rollers seated in said recesses, said series of rollers being spaced apart to correspond with the radial spacing of said races, said rollers being seated on said carrier plate for movement freely in a plane transversely of the plane of said carrier plate, said clutch plates being spaced apart only sufficient to permit the rollers to roll freely between the beveled faces of said opposing races in an undulating path circumferentially of said clutch plates, the number of rollers and teeth in each race are proportioned in a ratio of at least three teeth to two rollers.

14. A divided power flow transmission comprising a driving member and a pair of driven members, said driving member comprising a rotatable carrier plate having a plurality of radially extending frusto-conical rollers positioned thereon for movement in a plane transversely of the plane of said plate, said rollers being arranged in at least two annular radially spaced series, said driven members comprising a pair of clutch plates positioned coaxially with said carrier plate on opposite sides thereof, each of said clutch plates having concentric annular races thereon spaced radially to correspond with the annular series of rollers on said carrier plate, said races being corrugated, the crest of the corrugations forming radially extending teeth, said plates being spaced apart just sufficient to permit said rollers to roll freely between the crest of a corrugation on one plate and the center of the trough of a corrugation on the other plate, said corrugations being beveled such that the rollers maintain line contact with the corrugations on both of said clutch plates, the rollers in each of said series being arranged in pairs, the rollers in each pair being disposed side by side with their axes spaced transversely of the plane of said carrier plate and with their adjacent surfaces in line contact.

RALPH R. RANDALL.

References Cited in the file of this patent

UNITED STATES PATENTS

| Number | Name | Date |
|---|---|---|
| 1,283,283 | Patch | Oct. 29, 1918 |
| 1,568,358 | Welsh | Jan. 5, 1926 |
| 1,857,978 | Robbins | May 10, 1932 |
| 1,897,555 | Ford | Feb. 14, 1933 |

FOREIGN PATENTS

| Number | Country | Date |
|---|---|---|
| 180,556 | Switzerland | Oct. 31, 1935 |
| 313,791 | Germany | July 19, 1919 |
| 431,020 | Great Britain | June 28, 1935 |